United States Patent [19]
Hopson

[11] Patent Number: 5,349,418
[45] Date of Patent: Sep. 20, 1994

[54] CRT METHOD OF AND APPARATUS FOR ILLUMINATING PHOTOGRAPHIC NEGATIVES TO PRODUCE A HARD COPY

[75] Inventor: Talmadge W. Hopson, Minnetonka, Minn.

[73] Assignee: Lifetouch Inc., Minneapolis, Minn.

[21] Appl. No.: 471

[22] Filed: Jan. 5, 1993

Related U.S. Application Data

[63] Continuation of Ser. No. 773,438, Oct. 9, 1991, Pat. No. 5,182,594.

[51] Int. Cl.⁵ .............................. G03B 27/80
[52] U.S. Cl. .............................. 355/20; 355/38; 355/77
[58] Field of Search ............ 355/20, 38, 68, 77; 358/75, 76, 80; 364/525, 526; 346/110 R, 107 R

[56] References Cited

U.S. PATENT DOCUMENTS

| | | | |
|---|---|---|---|
| 3,845,498 | 10/1974 | Justice | 358/11 |
| 4,340,905 | 7/1981 | Balding | 358/80 |
| 4,394,089 | 7/1983 | McIntosh et al. | 355/88 |
| 4,576,891 | 3/1986 | Adair | 430/138 |
| 4,635,108 | 1/1987 | Reeber et al. | 358/76 |
| 4,682,248 | 7/1987 | Schwartz | 360/32 |
| 4,734,756 | 3/1988 | Butterfield et al. | 358/3 |
| 4,740,820 | 4/1988 | Endo | 355/20 |
| 4,849,809 | 7/1989 | Tahara et al. | 358/75 |
| 4,876,567 | 10/1989 | Yamaguchi | 355/20 |
| 4,916,525 | 4/1990 | Drummond | 358/12 |
| 4,929,967 | 5/1990 | Hara | 346/110 R |
| 4,939,581 | 7/1990 | Shalit | 358/244 |
| 4,942,462 | 7/1990 | Shiota | 355/20 |
| 4,965,592 | 10/1990 | Sangyoji et al. | 346/110 R |
| 5,012,333 | 4/1991 | Lee et al. | 358/80 |
| 5,021,978 | 6/1991 | Stone et al. | 364/525 |

Primary Examiner—D. Rutledge
Attorney, Agent, or Firm—Haugen and Nikolai

[57] ABSTRACT

A CRT apparatus for illuminating color photographic negatives to faithfully produce colored hard copies in photographic printers without the use of dark shutters, heat shields and/or moving color filters. The preferred embodiment of the present invention employs an ordinary color television with a R, G, B input, driven by a signal controller and a specially designed CRT. The controller previews and analyzes the negative with inputs from an ordinary color television camera illuminated by a standard light source. A sample of the recording media for the hard copy, which was exposed to a pattern generated by the controller and displayed on the CRT, acts as a standard reference for the controller's mathematical manipulations to analyze the hard copy media sample, and control the Kelvin temperature and luminance settings of the CRT when exposing the hard copy through the subject negative in order to achieve automatic color balance in the hard copy.

23 Claims, 7 Drawing Sheets

CRT METHOD OF AND APPARATUS FOR ILLUMINATING PHOTOGRAPHIC NEGATIVES TO PRODUCE A HARD COPY

This is a continuation of application Ser. No. 07/773,438, filed Oct. 9, 1991, now U.S. Pat. No. 5,182,594.

BACKGROUND OF THE INVENTION

1. Field of the Invention

The present invention relates to a picture recording apparatus, and more particularly, but not exclusively, to CRT illumination of silver halide negatives for printing color pictures on photographic print paper, or other photographic media.

2. Description of the Prior Art

There has been generally known a device for illuminating color photographic negatives in order to produce hard copies referred to in the art as a lamphouse. The purpose of a lamphouse is to illuminate the negative in a controlled fashion so as to expose the color photographic print paper's three dye layers to faithfully reproduce the image captured on the negative.

The term lamphouse is further subdivided into four categories according to their method of operation. The methods have been described in the art as white light, additive, subtractive, and false color.

The white light method employs a single or plurality of incandescent lamps whose radiation path is partially or fully interrupted by a plurality of color optical filters. All of the filters remain stationary throughout a batch operation, the negatives in the batch do not vary widely in transmission density or color balance.

The additive method employs a single or plurality of incandescent lamps whose radiation path is partially or fully interrupted by a plurality of color optical filters; however, the negative is illuminated by each of the colors sequentially, red, blue and green. The time of illumination may vary from color to color. In another additive method known to the art, illumination by color is simultaneous and the time of illumination is constant; however, the level of luminance may vary. The filters may or may not be stationary. This method is used where negative densities and color balance vary widely.

The subtractive method employs a single or plurality of incandescent lamps whose radiation path is partially or fully interrupted by a plurality of color optical filters, initially the negative is illuminated by all colors; red, blue and green simultaneously. However, when the individual dye layer exposure of the photographic paper has been satisfied, the filter associated with that dye layer is mechanically introduced into the radiation path to cut off the associated portion of the radiation spectrum. This method is used where negative densities and color balance vary widely.

All of the methods and apparatus for illuminating negatives mentioned above have these common characteristics: they all employ incandescent lamps, they all require radiation separators of one form or another, and they all require blowers to remove convected heat from the device.

Furthermore, all of the above mentioned apparatus and or methods require a device known in the art as a filter pack to manipulate the Kelvin temperature of the radiated output of the incandescent lamps to a workable center range, in addition to individual color optical filters, cyan, yellow and magenta for the subtractive method, and red, blue and green for the additive method. The individual filters are required to compensate for deviations from workable center. Prior art also requires the use of a device known to the art as a capping or dark shutter to interrupt the radiated output of the incandescent lamp or lamps to control the exposure period of the photographic paper.

Halogen incandescent lamps depend on incandescence or the heat produced by electrical currents through their filaments to produce radiation in the visible light spectrum, and at best are only 26 percent efficient in the production of radiation in the visible light spectrum. The mass of the filaments in incandescent lamps has an inertia to heating and cooling; and therefore, cannot be operated on and off with the rapidity required by high production capacity photoprinting apparatus. Further, the type of halogen incandescent lamps employed in prior art have a life expectancy of approximately 40 hours when operated at rated voltages. Halogen incandescent lamps emit a broad and continuous spectrum of radiated energy in the visible light region, in addition to ultra violet and infrared radiation; and therefore, must employ filters to control the photographic process. In all of the above described methods and apparatus, the hard copy media is coated with a plurality of layers of silver halide compounds known to the art as photosensitive dye layers.

In another version of prior art, the hard copy media is a paper substrate whose photosensitive surface is impregnated with a plurality of plastic microbeads containing dyes of cyan, magenta and yellow. When exposed to radiation in the ultraviolet spectrum and near ultraviolet regions of the visible light spectrum, the microbeads will harden. The beads containing yellow dye are sensitive to blue light, while the beads containing magenta and cyan dyes are sensitive to select regions of the ultraviolet radiation spectrum. After exposure, the paper is passed between pressure rollers, where the hardened beads are crushed, spilling their dyes into the paper fibers, thus reproducing the color image captured on the negative, each microbead representing a color pixel.

Because color photographic negatives only filter light in the visible light spectrum, a plurality of color separation internegatives must be prepared in order to filter radiation and expose the hard copy in the ultraviolet spectrum. The internegatives are then interposed between the hard copy and a source of ultraviolet light, such as carbon arcs and/or mercury vapor lamps. Exposures are time consuming because they are sequential and require positive registration of the plurality of negatives. This method is known in the art as the false color method.

It is therefore an object of the present invention to provide a method of and apparatus for illuminating photographic negatives to produce a hard copy without the use of filter packs, individual color optical filters, dark or capping shutters and incandescent lamps. It is a further object of the present invention to render the printing of color photographic paper from color photographic negatives completely automatic without human intervention.

SUMMARY OF THE INVENTION

The preferred embodiment of the present invention consists of a CRT or a plurality of CRTs for illuminating the photographic negative, an ordinary television to drive the CRT, a controller to generate the input signals for the television, in addition to manipulating the input from a photodetector and controlling the time and sequence of the overall apparatus operation.

According to a feature of the present invention the critically selected phosphors of the CRT emit narrow bands of radiation that match in peak intensity, the peak sensitivity of the hard copy's plurality of dye layers as opposed to incandescent lamps that emit broad bands of radiation. The individual color phosphors may or may not be limited to red, blue and green, and they may or may not lie within the spectrum of visual radiation. The phosphors are deposited on the face of the CRT in a regular pattern, and may be excited by one or a plurality of electron emitters in a controlled fashion. Said emitters employ what is known in the art as dispenser type cathodes.

According to another preferred embodiment of the present invention a plurality of CRTs may be employed, each having a different type phosphor uniformly deposited on the face of the CRT. The radiated output of the plurality of CRT's is optically mixed and converged on the illuminated negative.

In still another preferred embodiment of the present invention, an image of the subject negative is presented on the screen of the CRT in a plurality of phosphors that radiate their energy in the ultraviolet and near ultraviolet regions of the visible light spectrum. The image is then projected through an appropriate lens onto the sensitized surface of the hard copy to produce a picture.

According to another feature of the preferred embodiment of the present invention, the level of intensity of each band of radiation and the period of time the hard copy is exposed to the radiation intercepted by the photographic negative is determined by the controller. The controller operates through, but is not limited to, four major cyclic loops, exposure of a sample of the hard copy media, photodetection scanning of the developed hard copy media sample, photodetection scanning of the subject negative in each of its recorded negative dye layers, and generating the appropriate television signals to be input to the television to cause the dye layer associated phosphors to illuminate the subject negative, and/or present an image of the negative to be projected onto the hard copy.

Significant aspects and features of the present invention include the use of a specially designed CRT or CRTs to illuminate color photographic negatives in order to produce a hard copy.

Another significant aspect and feature of the present invention is the unique design of the CRT, whereby the envelope of the CRT has fused to it a lens instead of a faceplate, said lens having been coated on its inner surface a phosphor or phosphors whose peak radiated output match the peak sensitivity of the hard copy. In addition, the subject CRTs employ what is known in the art as dispenser type cathodes.

Still another significant aspect and feature of the present invention is the use of CRTs as a standard light source in a closed servo loop consisting of an RGB TV driver, a color TV camera and a general controller.

A further aspect and feature of the present invention is the creation of electronic internegatives by photographing a color photographic negative with a color TV camera, separating the individual color components, digitizing the resultant video signals, mathematical manipulating the digitized image, the creation of a new video signal, and transmitting said video signal to a RGB TV where it is displayed on a CRT of the character alluded to above. This aspect and feature of the present invention is employed when the radiometric character of the negative and the hard copy are incompatible.

Having thus described the embodiments of the present invention, it is the principal object hereof to provide an alternative illuminator of color photographic negatives for producing hard copies which will eliminate the use of tungsten filament lamps in photofinishing lamphouses; eliminate the use of moving color filters; eliminate the use of what's known to the art as capping or dark shutters; radically reduce energy consumption; reduce maintenance costs; and provide a level of control of the photofinishing process never before realized.

Another object of the present invention is to provide a more efficient method and apparatus for producing hard copies from color photographic negatives when the radiometric character of the negative and the hard copy are incompatible, in a manner known to the art as the false color method.

It is a further object of the present invention to render the process of producing hard copies from color photographic negatives completely automatic.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENT

Figure 1:
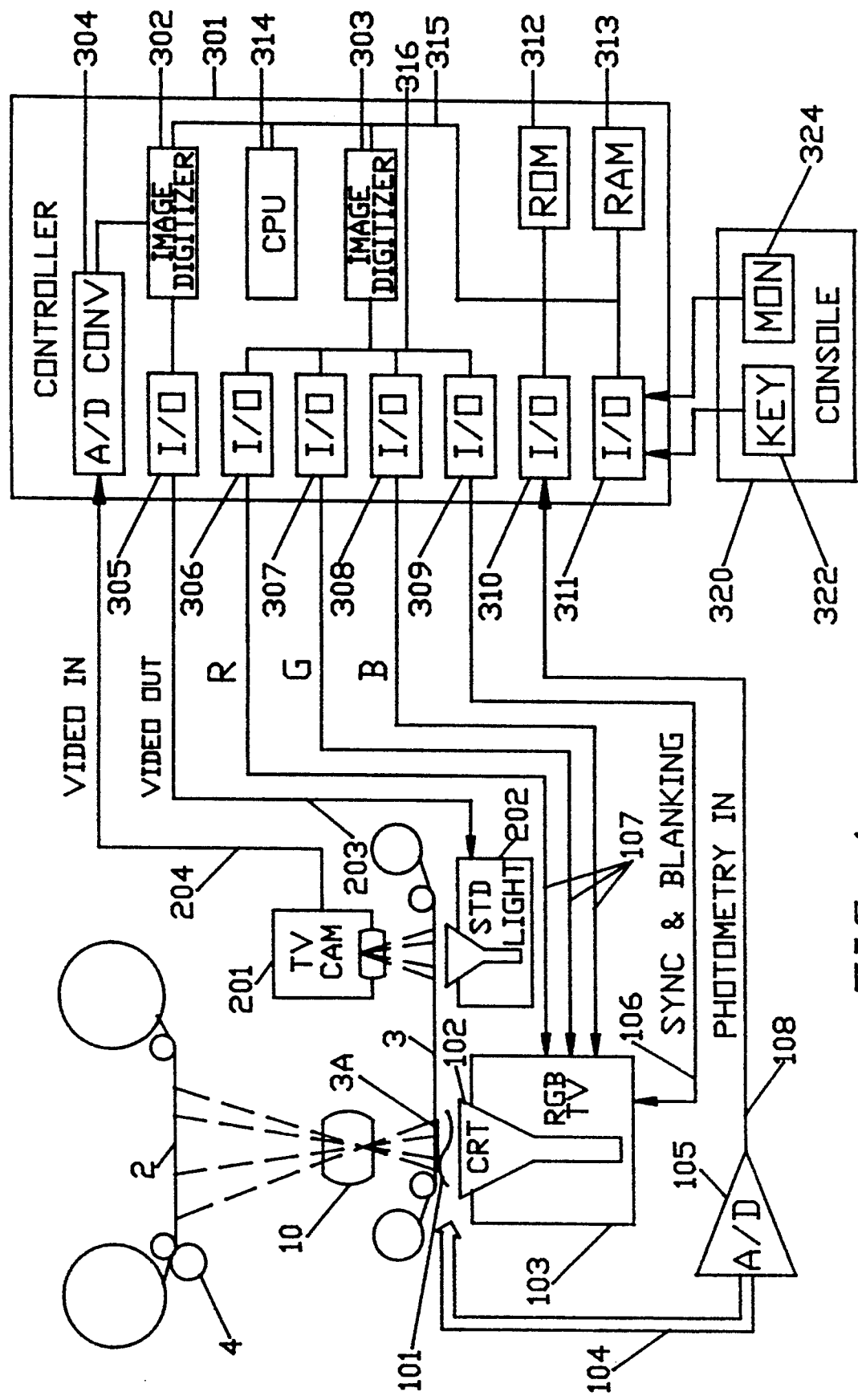
FIG. 1 is an explanatory illustration of the CRT apparatus for illuminating photographic negatives to produce hard copies.

FIG. 1 is an explanatory illustration of the apparatus for producing hard copies from color photographic negatives, and although schematic in nature, reflects the physical disposition of its component parts, including: the hard copy media 2; the negative 3; pinch rollers 4 used for final development of microbead impregnated photographic paper; a lens 10 employed for projecting the image of the hard copy onto the sensitized surface of the hard copy; an analog to digital converter 105 used to monitor the light output 101 of the main illuminating CRT; transmission lines 106, 107 and 108 that carry video and sensitometry data to and from the general controller 301; a color TV camera 201 which photographs a single frame of the subject negative in the preview position; an ordinary RGB color TV set 202 used as a standard light source for illuminating the subject negative in the preview position; a transmission line 203 that carries video signals from the general controller 301 to the standard light source RGB color TV set 202; a transmission line 204 along which video signals from the camera 201 are returned to the general controller 301; a general controller 301 which contains an image digitizer 302 that converts incoming NTSC video signals to digital images, an image digitizer 303 that converts digital images into outgoing NTSC video signals, an analog to digital converter 304 that converts NTSC video signals into digital data, input output management circuits 305 through 311 that interface between the controllers internal circuits and external components, a read only memory 312, a random access memory 313, a central processing unit 314; and an internal communications bus 315 that the central processing unit 314 interfaces with the controllers internal components.

The operator console 601 allows manual instructions to be inputted to the general controller 301, and contains a keyboard 322 and a video monitor 324.

Figure 2:
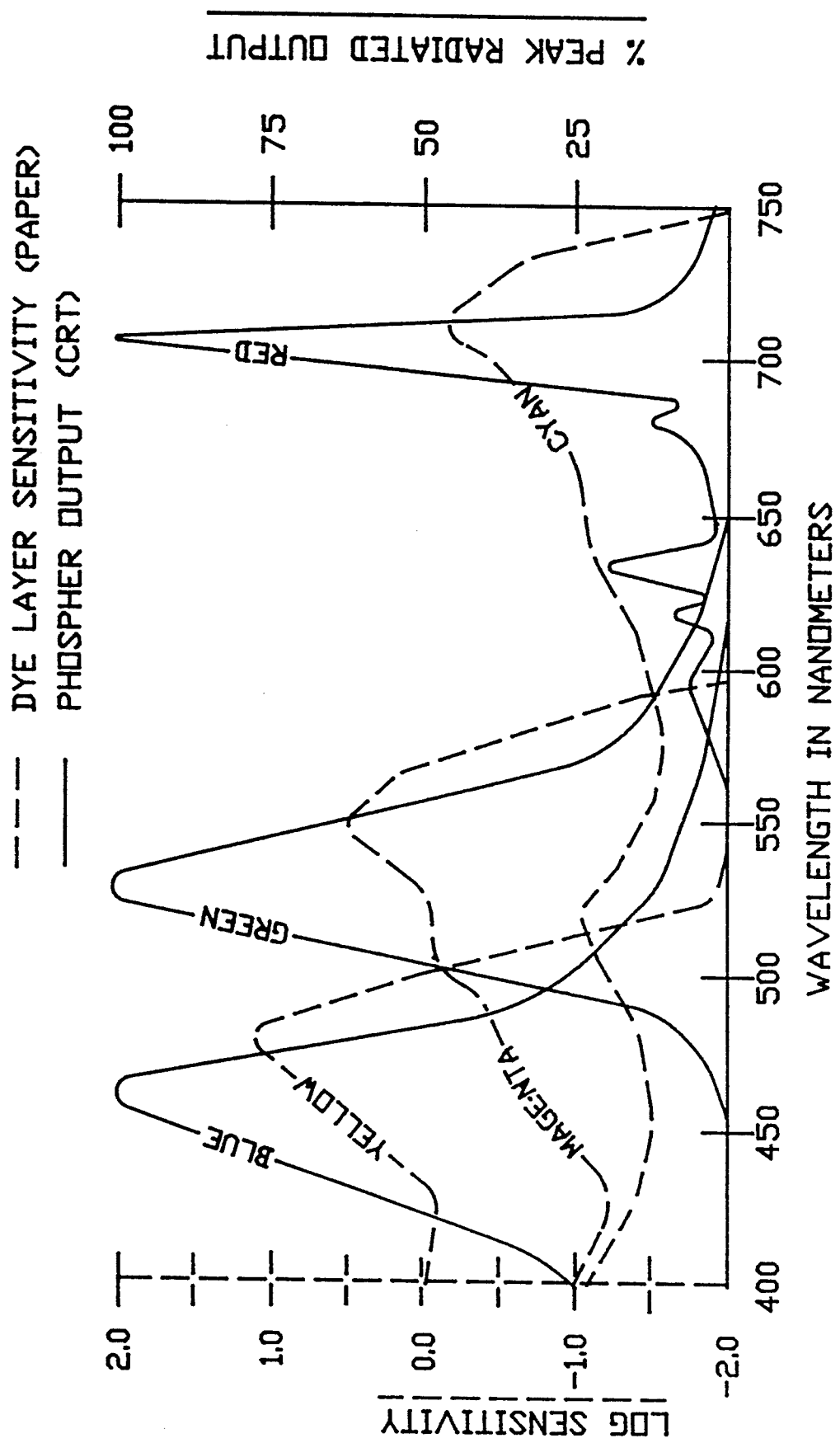
FIG. 2 is a graphic plot of the dye layer response of a typical color photographic paper overlaid with a graphic plot of the spectral output magnitude of typical phosphors employed in a preferred embodiment of the present invention.

FIG. 2 is a graphic plot of the dye layer response of a typical color photographic paper overlaid with a graphic plot of spectral output magnitude of typical phosphors employed in the preferred embodiment of the present invention. The common element, WAVELENGTH IN NANOMETERS is plotted along the X axis, LOG SENSITIVITY of the photographic paper is plotted along the Y axis to the left, and the PERCENTAGE OF PEAK RADIATED OUTPUT of the phosphors is plotted along the right Y axis. Curves representing the RED, BLUE and GREEN phosphor output are shown in solid lines while the photographic paper dyes YELLOW, MAGENTA and CYAN responses are illustrated in dashed lines.

It is important to note that while there seems to be considerable crossover of the dye layer sensitivity in the region of the BLUE phosphor's peak radiated output, that the dye layer response is plotted on a logarithmic scale and that the sensitivity of the YELLOW layer is ten times that of MAGENTA and the hundred times that of CYAN. It should be further noted that because of the YELLOW dye layer's extreme sensitivity to BLUE light, that very little blue light is required and as such has little or no effect on the MAGENTA and CYAN layers.

Figure 3:
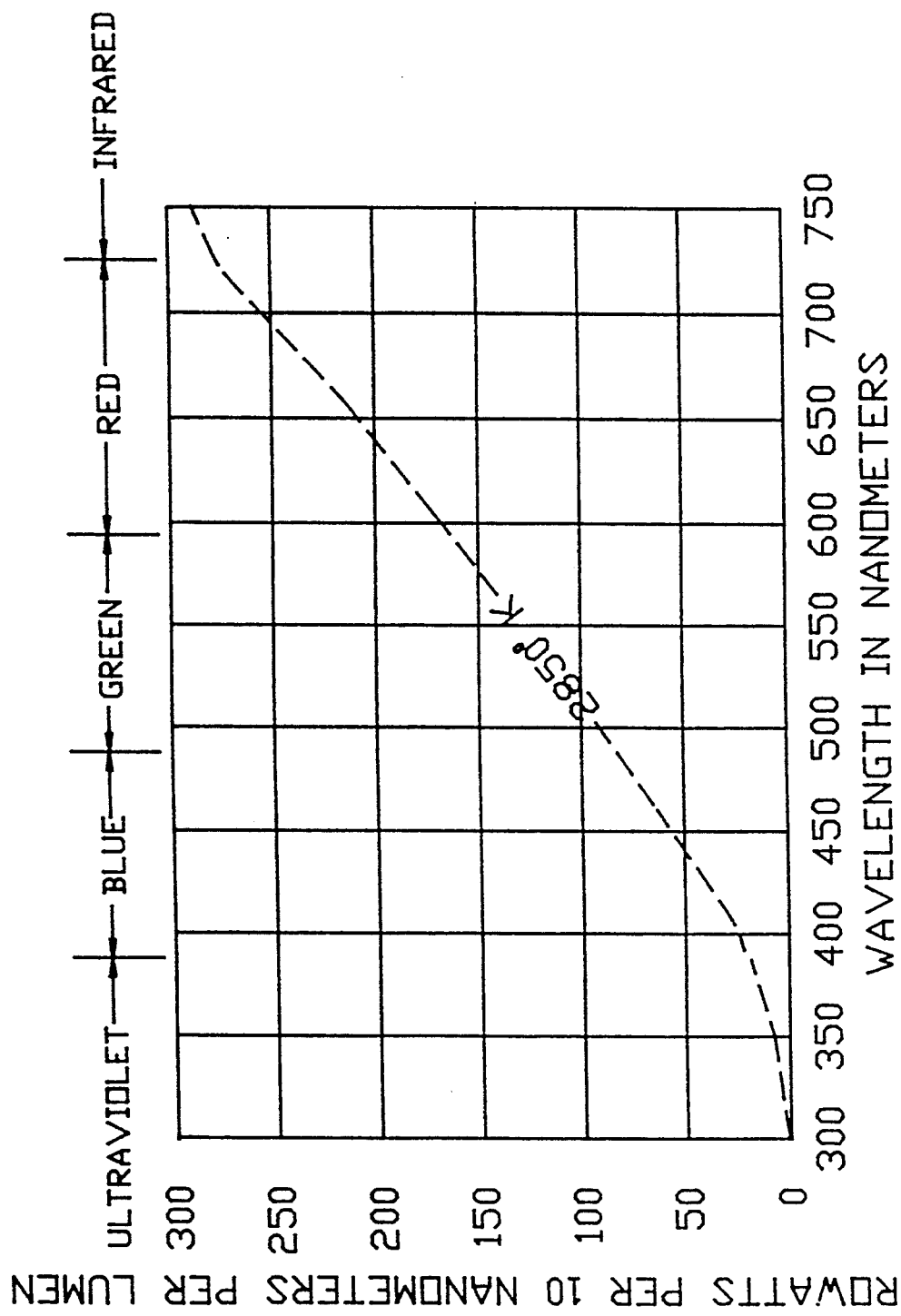
FIG. 3 is a graphic plot of the spectral output magnitude of a typical halogen incandescent lamp employed in photoprocessing.

FIG. 3 is a graphic plot of the spectral output magnitude of a typical quartz halogen incandescent lamp of the type currently used in color photographic printers. It should be noted that the curve is continuous over the visual spectrum, having very little output in the blue region and increasing through green to red and peaking off the chart in the infrared region. When compared to the individual curves depicted in FIG. 2, it can be readily seen that there is enhanced control over radiated output, and a reduction in radiation above 750 nanometers where most of the unwanted heat is produced in prior art lamphouses.

Figure 4:
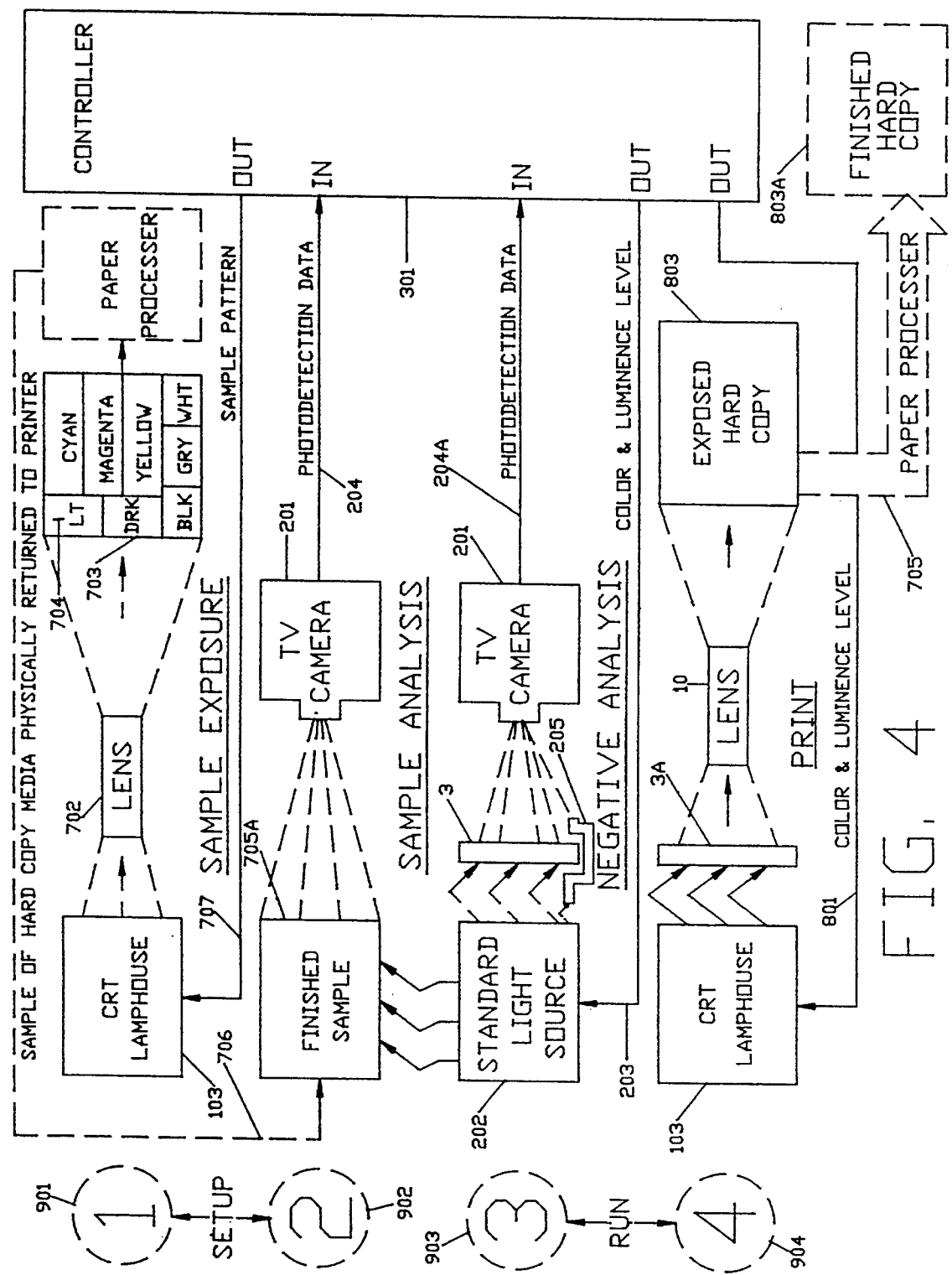
FIG. 4 is an illustration showing the four major control loops involved in automatically exposing the hard copy through a CRT illuminated negative.

Referring to the drawings and, in particular to FIG. 4, there is shown a graphic representation of the four major operational loops. "One" 901 and "two" 902 depict the set-up operations necessary to ascertain the sensitometric nature of the photographic media 2 to be used as a hard copy. These are one time set up loops, and are only operated whenever the hard copy emulsion is changed or for quality control monitoring. In this preferred embodiment of the present invention, we will identify the hard copy media as photographic paper 2. Referring again to FIG. 4, loops "three" 903 and "four" 904 depict the operational sequence in the run or production mode of the present invention, when employed in a typical high speed photographic printer. FIG. 4 is purely schematic, while FIGS. 1 and 5, although schematic, are more indicative of the physical disposition of the components of the preferred embodiment.

Referring to FIG. 4, the controller 301 is a general purpose personal computer with video frame grabbing and graphics capability. The controller has digitally stored in its read only memory 302 of FIG. 1 containing (ROM) a sample pattern 704 which consists of 256 gradients of red, green and blue pure color tones. The pattern is converted into RGB television signals and routed along lines 707 to the CRT lamphouse 103 where it is displayed on the screen of the CRT 102 of FIG. 1. The display on the screen of the CRT is projected through lens 702 onto the sensitized emulsion surface of the photographic paper 2. In one version of the preferred embodiment of the present invention, the dye layers of the emulsion of the photographic paper cyan, magenta and yellow respond respectively to red light, green light and blue light. In another version of the preferred embodiment of the present invention, the dye carriers of the photographic paper, cyan, magenta and yellow respond to ultraviolet and near ultraviolet light of the visible light spectrum. Initially the screen of the CRT 102 is blackened, and then illuminated with the sample pattern for a period of time and then returned to black. The period of time of illumination (sample exposure) is arbitrarily, but rationally selected by the operator to exactly match the intended production run exposure time. All operator set up and run variables are entered into the controller via the console 320 of FIG. 1. Contained within the sample pattern in addition to the aforementioned shades of cyan, magenta and yellow are uniform patches of targeted highlight light skin tones, targeted highlight dark skin tones, white, gray and black. It is important to note that unlike the patches of cyan, magenta and yellow, which occur in 256 gradients of tone, the black, gray and white patches are uniform in tone over the entire area of the patch. All patches are bounded by a series of coded black and white bars for registration.

In the case of silver halide papers, after being chemically processed in a paper processor 705 the finished sample enters loop "two" 902; however, in the case of microbead papers, they are passed through pressure rollers prior to entering loop "two". It is important to note that in photolabs where a plurality of chemical paper processors are employed, the same paper processor that is intended for use in the production run must be employed to prepare the finished sample. This is not true for paper containing microbeads. The finished sample 705A is placed in an appropriate sample holder, illuminated by a standard light source 202, and viewed by a color TV camera 201. The NTSC output of the camera 201 is transmitted to the controller 301 via line 204 and converted into single frame digital data by the image digitizer 302 and stored in RAM 313 illustrated in FIG. 1. The stored raster is mapped in an array of 1024×1024 pixels. As previously mentioned, each colored patch of the sample pattern 704 is bordered by a series of alternating black and white bar codes. The associated pixels, therefore, take on a value of R-0, G-0, B-0 alternating with R-256, G-256, B-256 in a regular numerical sequence. Since the color patches are evenly divided into 256 shades of chromic intensity, it is relatively advantageous for the controller to ascertain the level of chromaluminance that produced each stored pixel.

In the preferred embodiment of the present invention, the standard light is an ordinary small screen color monitor TV 202 whose input 203 and subsequent light output is under the control of the controller 301. A servo loop made up of the TV monitor 202, and a fiber optics sampling probe 205 with one end in optical contact with the monitor screen standard light source 202 and the other end in the field of view of the camera lens of the TV camera 201, bypassing the subject negative 3. The TV camera 201 and certain internal components of the controller 301, the A/D converter 304, and the image digitizer 302 maintain the standard light's output of luminance and chromance at a constant level within 0.5% of maximum.

For silver halide paper, in the RUN mode, loop "three" 903, the standard light source 202 illuminates a negative frame 3 in the preview position. The color TV camera 201 scans the illuminated negative 3, and transmits NTSC video image over line 204A to the controller 301 where the single frame is digitized in values of red, green and blue by the image digitizer 303, and the data is stored in RAM 313 of FIG. 1. The CPU 314 searches the RAM 313 where the subject frame data is stored for highest and lowest values of red, blue and green, representative of the highest and lowest values of transmission density in the subject negative frame. The CPU 314 then computes the algebraic average value for each color and adds a predetermined offset factor, such as, but not limited to, lens compensation, film type, studio lighting compensation, film aging factor and film processing factor. The CPU 314 then compares the result with the sensitometric data previously obtained from the hard copy sample which was stored in ROM 312, and with targeted gray or skin tone values, determines the level of chromance and luminance necessary for faithful reproduction of the negative in the hard copy. The digitized result is stored in RAM 313 until the subject negative frame reaches the print gate 3A.

When the subject negative frame is positioned in the print gate 3A, the screen of the CRT 102 is black (not illuminated). At the start of the exposure cycle, the CPU 314 retrieves the computed chromance and luminance data necessary for the faithful reproduction of the subject negative frame from RAM 313, and transmits it in the form of NTSC RGB video signals along line 801 (lines 106 and 107 in FIG. 1), causing the CRT 102 in the lamp house 103 to be illuminated.

However, for the false color method involving papers impregnated with microbeads, the digitized image stored in RAM is displayed directly in the face of the CRT. After appropriate chroma and luminance corrections have been applied, there is no intervening negative in the light path. False color transition is advantaged through the choice of phosphors in the CRT or CRTs.

The screen will remain illuminated until the CPU 314 transmits signals that return the screen to black (end of exposure period). As previously stated, the exposure period is operator predetermined and entered via the console 320. In the preferred embodiment of the present invention, NTSC protocol is employed, limiting the exposure period increments to one-half of an interlaced frame or increments of 16.6 milliseconds. However, if different increments are desired, the frame rates could be changed. During the exposure, an image of the illuminated negative 3 is projected onto the emulsion surface of the photographic paper 803. In the false color method the image of the face of the CRT is projected directly onto the photosensitive surface of the microbead impregnated paper. The exposed photographic paper is then routed through the paper processor 705 in a manner known in the art to produce the finished hard copy 803A.

The halogen tungsten lamps known in the art for use in photographic printers emit radiation at or about 2850 degrees Kelven (see FIG. 3). Notice, there is very little blue light output, and that the output progressively increases through green to red peaking at infrared. The phosphors known in the art for use in color television are balanced to radiate at or about 8300 to 8500 degrees Kelven. Color photographic print papers known in the art are specifically designed and manufactured for use with halogen tungsten lamps, i.e., they are extremely sensitive to blue light, moderately sensitive to green light and grossly insensitive to red light (see FIG. 2). Further, the red phosphors currently known in the art for use in color television consist wholly of, or is mixed with, YTTRIUM OXYSULFIDE doped with EUROPIUM, which exhibits a peak spectral output at a wavelength of 630 microns. However, the cyan dye layer of silver halide photographic print paper currently used in the art is five times more responsive at 705 microns. (NOTE: in FIG. 2, sensitivity is plotted on a logarithmic scale.)

Figure 5:
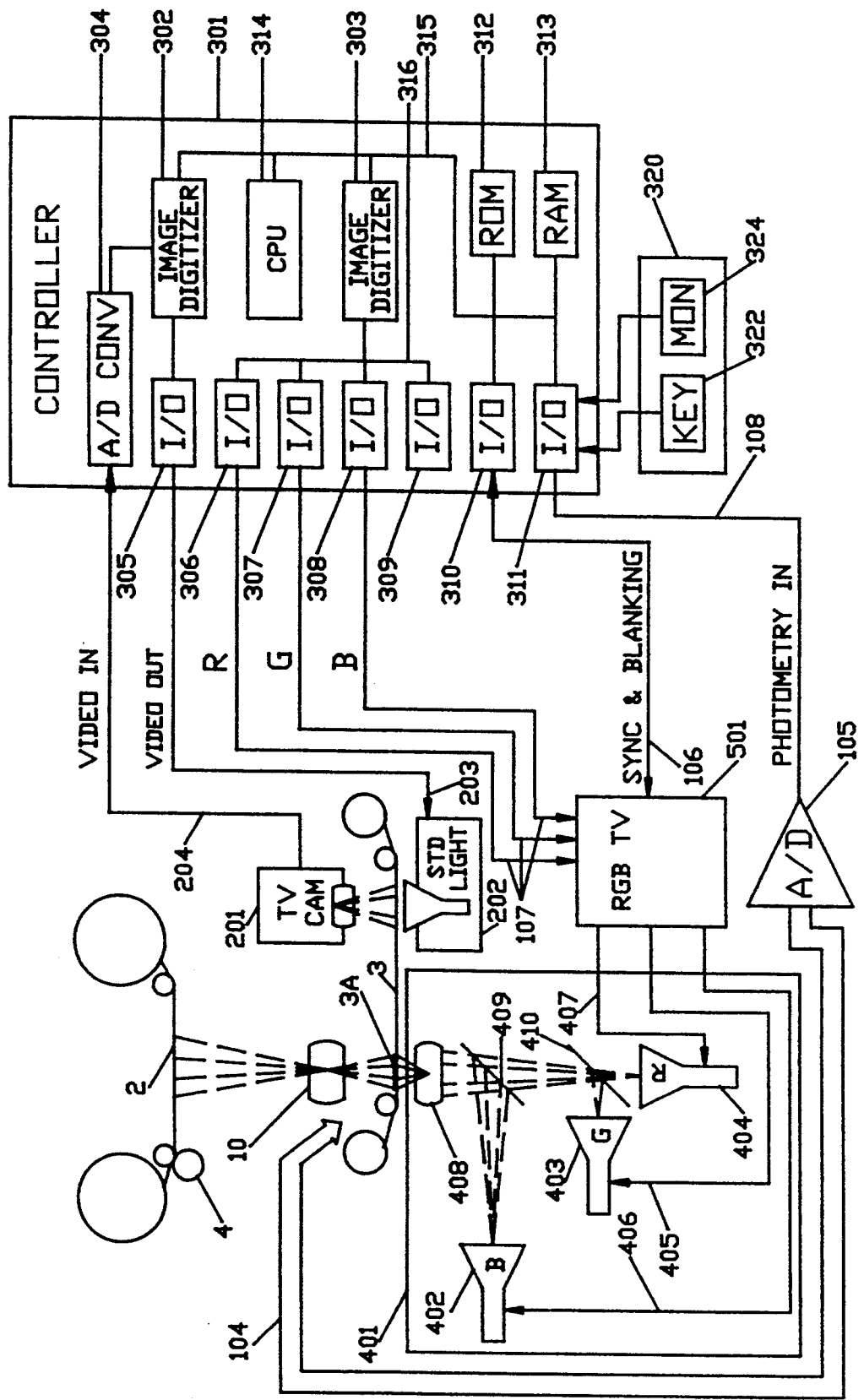
FIG. 5 is an explanatory illustration similar to FIG. 1 showing another preferred embodiment of the present invention.

FIG. 5 is an explanatory illustration similar to FIG. 1 showing another version of the preferred embodiment of the present invention. It differs from FIG. 1 by virtue of the fact that it employs three separate CRTs to illuminate the subject negative. In FIG. 5, all items are identical to those shown in FIG. 1, except items 102 and 103 are replaced by items 401 through 409. An RGB color TV set 401 drives the three CRTs 402, 403 and 404 that illuminate the subject negative, or in the case of false color, display the digitized image.

The RGB color TV set 401 is an ordinary projection RGB TV, and CRTs 402, 403 and 404 are the RED, BLUE and GREEN cathode ray tubes, respectively. Transmission lines 405, 406 and 407 carry the RED, BLUE and GREEN signals which are fed to the cathode ray tubes 402, 403 and 404. Also included is an auxiliary condenser lens 408, a 50/50 dichroic beam splitter 409, and a 70 reflect/30 pass dichroic beam splitter 410.

The preferred embodiment of the present invention employs a tricolored CRT 102 of FIG. 1, or a unicolored CRT 402 of FIG. 5 that is manufactured with, but not limited to, a red phosphor that exhibits a peak spectral output at 705 microns, such as ZINC PHOSPHATE doped with MANGANESE. The green phosphor of the CRT 104 is, but not limited to, ZINC SILICATE doped with MANGANESE. The blue phosphor of the CRT 403 is, but not limited to, ZINC SULFIDE doped with SILVER and GALLIUM. The false color method would employ, but not be limited to, such phosphors as ZINC SILICATE doped with TITANIUM and CALCIUM MAGNESIUM SILICATE doped with CERIUM.

Figure 6:
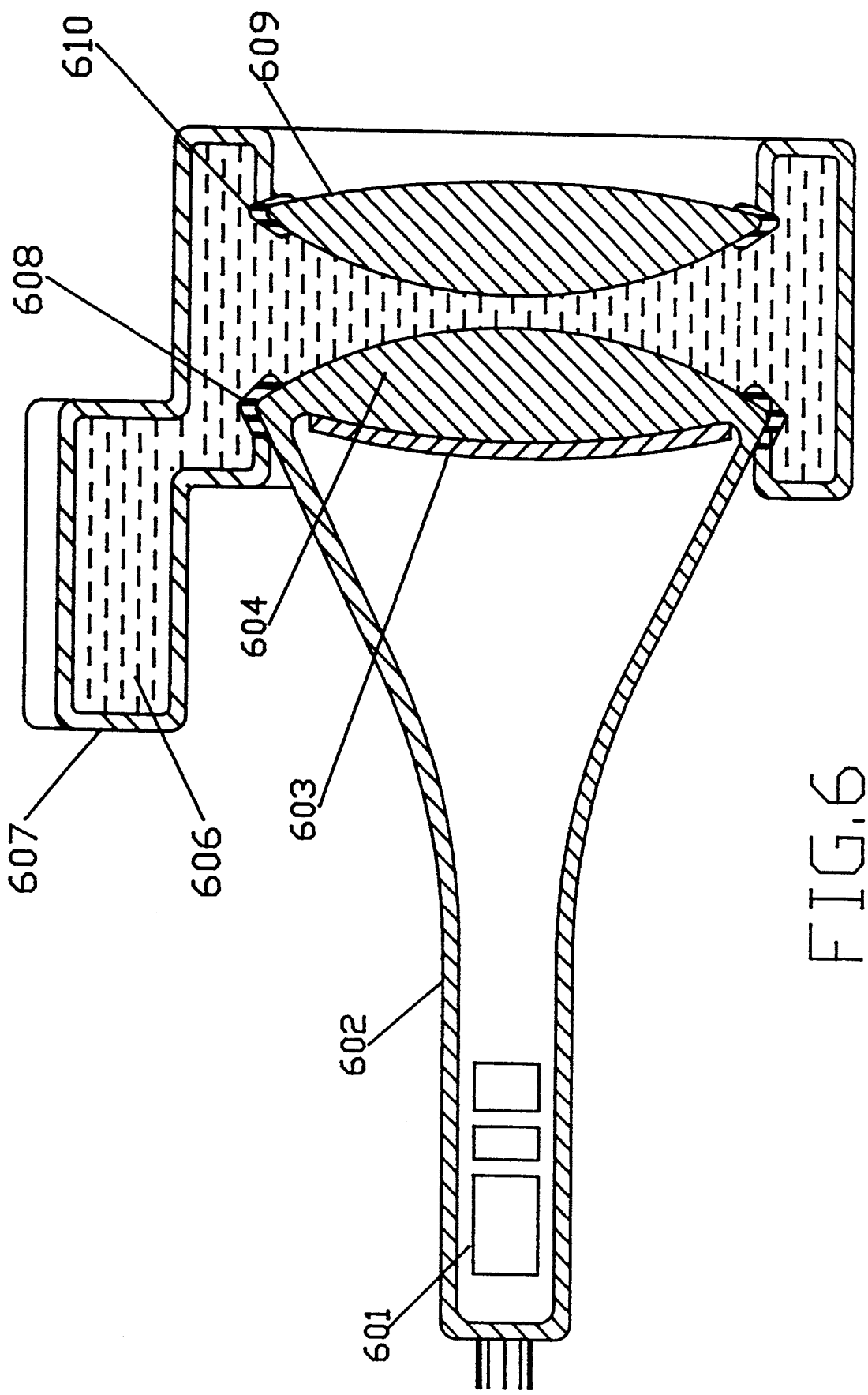
FIG. 6 is an illustration of the specially designed CRT typical of the preferred embodiment of the present invention; and, FIG. 7 is a flow chart demonstrating two examples of specific operation of the general control section shown in FIGS. 1 and 5.

FIG. 6 is an illustration of the specially designed CRT typical of the preferred embodiment of the present invention. In order to achieve the high production rates expected of a modern photographic printers (individual negative exposure periods of less the 0.25 seconds), requiring red emissions of 130 watts per square meter or better at the negative plane, the CRT is manufactured with a high performance cathode 601 known in the art as a dispenser cathode.

The faceplate of the CRT, which is normally flat or slightly curved in the prior art, is replaced by a condenser lens 604 fused to its envelope 602. The phosphor 603 is deposited directly on the first surface of the lens 604. The focal length of the condenser 604 and condenser 609 is such that it fills the entrance pupal of the projection lens 10 of FIG. 1 with the image of the subject negative 3. Ethylene glycol 606 is used to tightly couple lenses 604 and 609 optically. It also acts as a cooling agent for the phosphors, which are extremely temperature sensitive. An expansion chamber 607 contains ethylene glycol which is thermalstrictive. Gaskets 608 and 610 prevent leakage of the coolant.

Figure 7:
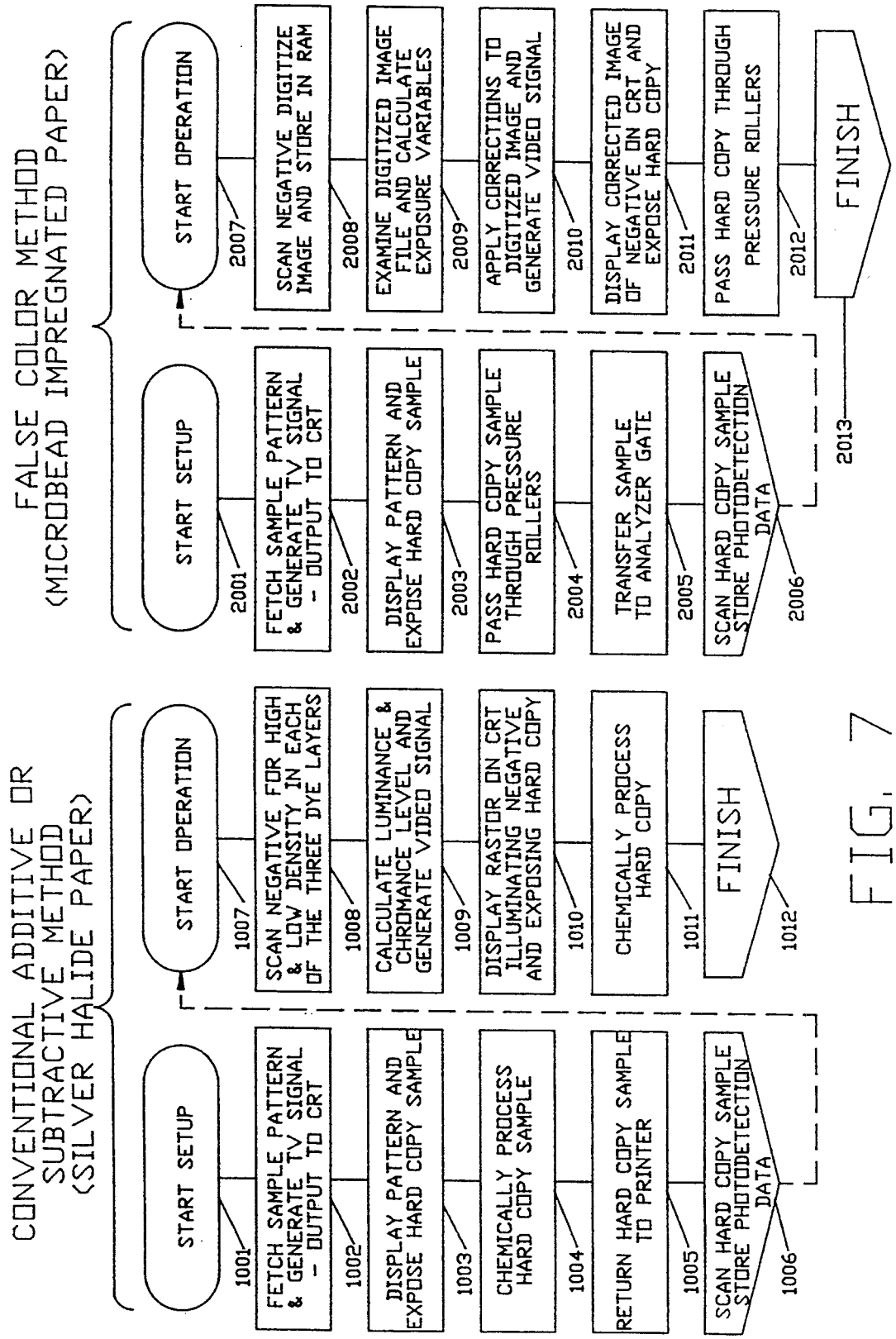

FIG. 7 is a flow chart demonstrating two examples of specific operations of the general controller.

1001 is the start of operations in the set-up mode for silver halide papers. In order to facilitate automatic operation the photometric nature of the hard copy material must be established.

1002 is a digitized video pattern which is stored in ROM which is the equivalent of a standard negative is retrieved and converted into a NTSC video signal and output to the display CRT.

1003, the CRT screen in its quiescent state, is not illuminated; however, in response to the NTSC video signal, it is illuminated for a period as predetermined by operator instructions input to the controller via the console. The exposure period is equivalent to the time predicated for normal operations. At the end of the exposure period, the CRT screen is returned to its quiescent state.

1004 is the exposed hard copy sample chemically processed off-line in the identical paper processor that is intended for use in the operational mode. It is important to repeat this is off-line function and not an operative function of the general controller.

1005, the exposed and processed hard copy sample, is returned to the printer and placed in a sampling gate.

1006, a previously digitized NTSC video raster, is retrieved from ROM and output to the standard light source, causing the hard copy sample to be illuminated, where it is photographed by a color TV camera. The resultant video signals are digitized and stored in RAM for future reference in the operation mode.

1007 is the start of the operation mode. It is initiated by the loading of color photographic negatives and the hard copy media represented by a sample which has been previously evaluated as shown in 1001 above, and operator commands.

1008, a NTSC video signal, is output to the standard light source which is now diverted to illuminate the subject negative in the preview position. The color TV camera photographs the illuminated negative, the resultant video signal digitized, and stored temporarily in RAM.

1009, the image file, is then scanned for high and low values in each of the primary colors of the negative, cyan, magenta and yellow. This data is algebraically coupled with predetermined offsets stored in ROM along with the hard copy sample data stored in ROM, resulting in a complementary average value for each of the primary negative colors and expressed in terms of RED, BLUE and GREEN. This data remains in temporary storage until the subject negative reaches the print gate. The resultant digital data is then converted into a NTSC video signal and output to the CRT.

1010, as previously stated, the CRT in its quiescent state is blackened. In response to the video signals output by the controller, it is now illuminated for a predetermined period, and returned to the quiescent state. It is important to note the illumination of the CRT is in the form of a plain raster, and not an image of the negative. Its purpose is to illuminate the negative in the print gate.

1011, after the exposure all files pertaining to the subject negative are expunged preparatory to the exposure of the next subject negative. The hard copy is then processed off-line to produce a finished picture.

1012 Finished.

2001 is the start of operations in the set-up mode for microbead papers. In order to facilitate automatic operation the photometric nature of the hard copy material must be established.

2002, a digitized video pattern which is stored in ROM, which is the equivalent of a standard negative is retrieved and converted into a NTSC video signal and output to the display CRT.

2003, the CRT screen in its quiescent state, is not illuminated. However, in response to the NTSC video signal, it is illuminated for a period as predetermined by operator instructions input to the controller via the console. The exposure period is equivalent to the time predicated for normal operations. At the end of the exposure period, the CRT screen is returned to its quiescent state.

2004, the command, is then given to advance the hard copy media through the pressure rollers.

2005, the sample, is then routed to the sample gate. It is important to note that unlike the operation described in 1004 this is an in-line operation.

2006, a previously digitized NTSC video raster, is output to the standard light source causing the hard copy sample to be illuminated, where it is photographed by a color TV camera. The resultant video signals are digitized and stored in RAM for future reference in the operation mode.

2007 is the start of the operation mode. It is initiated by the loading of color photographic negatives and the hard copy media represented by a sample which has been previously evaluated as shown in 2001 above, and operator commands.

2008, a NTSC video signal, is output to the standard light source which is now diverted to illuminate the subject negative in the preview position. The color TV camera photographs the illuminated negative and the resultant video signal digitized, and stored temporarily in RAM.

2009, the digitized image file, is then scanned for high and low limits in each of the negative's primary colors, cyan, magenta and yellow. The resultant data is then compared with the data stored in step 2006, and predetermined offsets are added to the file on a pixel by pixel basis.

2010, as previously stated, the CRT in its quiescent state, is blackened. In response to the video signals output by the controller, it is now illuminated for a predetermined period, and returned to the quiescent state.

2011, it is important to note that in this instance the corrected image of the negative is displayed directly on the face of the CRT and projected onto the hard copy media with no negative intervening in the light path. After exposure all files pertaining to the subject negative image are expunged.

2012 An advance signal is given to the hard copy media and the exposed hard copy is passed through the pressure rollers to produce a finished print.

2013 Finished.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

I claim:

1. An apparatus for producing a positive photographic print from a photographic negative by exposing photographic image receiving media, the apparatus comprising:
   means for determining chromic and luminance characteristics of the photographic negative and for generating a signal representing the determined chromic and luminance characteristics of the photographic negative;
   means for determining required levels of chromic and luminance necessary for faithful reproduction of the positive photographic print based on the chromic and luminance characteristics of the photographic negative, including:
      means for determining chromic and luminance characteristics of a swatch of said photographic image receiving media having different shades of chromic intensity and for generating a signal representing the chromic and luminance characteristics of each shade of chromic intensity;
      means for ascertaining levels of chromaluminance that produced the chromic and luminance characteristics of each shade of chromic intensity of the swatch; and
      means for comparing the ascertained chromaluminance of each shade of chromic intensity of the swatch with the chromic and luminance character-istics of the photographic negative to determine the required level of chromic and luminance intensity for faithful reproduction of the photographic negative;
   cathode ray tube means for exposing the photographic image receiving media to produce a positive photographic print; and
   means for controlling the chromance and luminance of the cathode ray tube means so that chromance and luminance of the cathode ray tube means are substantially equal the required levels of chromance and luminance.

2. The apparatus of claim 1 wherein the means for determining chromic and luminance characteristics of the swatch comprise:
   a standard light source for reflecting light off the surface of the swatch; and
   means for determining the chromic and luminance characteristics of the light reflected from the swatch.

3. The apparatus of claim 2 wherein the standard light source is a color television monitor.

4. The apparatus of claim 2 wherein the means for determining the chromic and luminance characteristics of the light reflected from the surface of the swatch comprises a television camera.

5. The apparatus of claim 1 wherein the means for ascertaining levels of chromaluminance that produced the chromic and luminance characteristics of each shade of chromic intensity of the swatch comprise:
   first digitizing means for digitizing the signal representing the chromic and luminance characteristics of each shade of chromic intensity of the swatch to produce a raster having pixels associated with each shade of chromic intensity;
   means for storing the raster; and
   means for ascertaining levels of chromaluminance that produced each stored pixel associated with each shade of chromic intensity.

6. The apparatus of claim 1 wherein the means for comparing comprise:
   second digitizing means for digitizing the signal representing an image of the photographic negative;
   means for storing the digitized signal representing the image of the negative; and
   a computer for comparing the digitized signal representing the image of the negative with the ascertained chromaluminance of each shade of chronic intensity.

7. The apparatus of claim 1 wherein each shade of chromic intensity of the swatch is bordered by a bar code.

8. An apparatus for producing a positive photographic print from a photographic negative by exposing photographic image receiving media, the apparatus comprising:
   means for determining chromic and luminance characteristics of the photographic negative and for generating a signal representing the determined chromic and luminance characteristics of the photographic negative;
   means for determining required levels of chromic and luminance necessary for faithful reproduction of the positive photographic print based on the chromic and luminance characteristics of the photographic negative;
   cathode ray tube means comprised of a tri-colored cathode ray tube for exposing the photographic image receiving media to produce a positive photographic print, wherein the cathode ray tube comprises:
      an envelope; and
      a lens fused to the envelope in lieu of a face plate, the lens having an entrance pupil; and
   means for controlling the chromance and luminance of the cathode ray tube means so that chromance and luminance of the cathode ray tube means are substantially equal the required levels of chromance and luminance.

9. The apparatus of claim 8 wherein the cathode ray tube comprises phosphor deposited on the entrance pupil of the lens, the phosphor having radiometric characteristics which match a sensitometric character of a color print media.

10. The apparatus of claim 8 wherein the cathode ray tube comprises a condenser secured in front of the lens.

11. The apparatus of claim 10 wherein the condenser is secured to the lens with ethylglycol.

12. The apparatus of claim 8 wherein the cathode ray tube comprises a dispenser cathode.

13. The apparatus of claim 9 wherein the phosphor comprises zinc phosphate doped with manganese.

14. The apparatus of claim 9 wherein the phosphor comprises zinc silicate doped with titanium and calcium magnesium silicate doped with cerium.

15. The apparatus of claim 8 wherein the means for controlling the chromance and luminance of the cathode ray tube means comprises a computer linked to the cathode ray tube means.

16. A method for producing a positive photographic print from a photographic negative by exposing photographic image receiving media, the method comprising:
   determining chromic and luminance characteristics of the photographic negative;
   determining required levels of chromance and luminance necessary for faithful production of a positive photographic print based on the determined chromance and luminance characteristics of the photographic negative by:
      determining chromic and luminance characteristics of a swatch of said photographic image receiving media having different shades of chromic intensity;
      generating a signal representing the chromic and luminance characteristics of the different shades of chromic intensity of the swatch;
      ascertaining standard levels of chromaluminance that produced the chromic and luminance characteristics of each shade of chromic intensity of the swatch; and
      comparing the standard levels of chromaluminance that produced the chromic and luminance characteristics of each shade of chromic intensity of the swatch with the chromic and luminance characteristics of the photographic negative to determine the required levels of chromance and luminance; and
   controlling the chromance and luminance of cathode ray tube so that the chromance and luminance of the cathode ray tube are substantially equal to the required levels of chromance and luminance so as to expose the photographic image receiving media to produce the positive photographic print.

17. The method of claim 16 wherein determining chromic and luminance characteristics of the photographic negative comprises the steps of:
   illuminating the negative; and
   viewing the illuminated negative to generate a signal representing an image of the photographic negative.

18. The method of claim 16 wherein determining chromic and luminance characteristics of a swatch comprise:
   reflecting light off the surface of the swatch; and
   determining the chromic and luminance characteristics of the light reflected from the swatch.

19. The method of claim 18 wherein ascertaining standard levels of chromaluminance that produced the chromic and luminance characteristics of each shade of chromic intensity of the swatch comprise:
   generating a signal representing the chromic and luminance characteristics of each shade of chromic intensity of the swatch;
   digitizing the signal to produce a raster having a pixel associated with each shade of chromic intensity;
   storing the raster; and
   ascertaining levels of chromaluminance that produce each stored pixel associated with each shade of chromic intensity.

20. Method of claim 16 wherein comparing the standard levels of chromaluminance comprises:
   generating a signal representing an image of the photographic negative;
   digitizing the signal representing the image of the photographic negative;
   storing the digitized signal; and
   comparing the digitized signal representing the image of the negative with the ascertained chromaluminance of each shade of chromic intensity.

21. The method of claim 16 wherein teh photographic negative is placed between the cathode ray tube and the image receiving media so that the photographic negative forms an image on the photographic image receiving media to expose the photographic image receiving media.

22. The method of claim 16 wherein the cathode ray tube has an image of the photographic negative displayed on its screen to expose the image receiving media.

23. The method of claim 16 comprising:
   adding a predetermined offset factor to the determined chromic and luminance characteristics of the photographic negative, the factor compensating for at least one of film type, lens type, studio lighting, film aging and film processing.

* * * * *